(12) United States Patent
Guo et al.

(10) Patent No.: US 12,297,315 B2
(45) Date of Patent: May 13, 2025

(54) WATER-BASED COMPOSITIONS

(71) Applicant: Dow Global Technologies LLC, Midland, MI (US)

(72) Inventors: Yinzhong Guo, Pearland, TX (US); Tuoqi Li, Pearland, TX (US); Xue Chen, Manvel, TX (US); Stephen W. King, Galveson, TX (US)

(73) Assignee: Arkema France, La Défense (FR)

( * ) Notice: Subject to any disclaimer, the term of this patent is extended or adjusted under 35 U.S.C. 154(b) by 644 days.

(21) Appl. No.: 17/625,903

(22) PCT Filed: Jul. 9, 2020

(86) PCT No.: PCT/US2020/041331
§ 371 (c)(1),
(2) Date: Jan. 10, 2022

(87) PCT Pub. No.: WO2021/011284
PCT Pub. Date: Jan. 21, 2021

(65) Prior Publication Data
US 2022/0275140 A1    Sep. 1, 2022

Related U.S. Application Data

(60) Provisional application No. 62/873,251, filed on Jul. 12, 2019.

(51) Int. Cl.
| | | |
|---|---|---|
| C08G 18/34 | (2006.01) | |
| C08G 18/32 | (2006.01) | |
| C08G 18/73 | (2006.01) | |
| C09D 7/20 | (2018.01) | |
| C09D 175/04 | (2006.01) | |

(52) U.S. Cl.
CPC ....... C08G 18/346 (2013.01); C08G 18/3203 (2013.01); C08G 18/73 (2013.01); C09D 7/20 (2018.01); C09D 175/04 (2013.01)

(58) Field of Classification Search
CPC ..... C09J 193/00; C09J 175/06; C08G 18/346; C08G 18/3203; C08G 18/73; C08G 2170/80; C08G 18/4018; C08G 18/4263; C08G 18/4638; C08G 18/4825; C08G 18/0823; C09D 7/20; C09D 175/04; B32B 2255/06; B32B 2255/26; B32B 15/085; B32B 15/09; B32B 7/12; B32B 27/32; B32B 27/36

See application file for complete search history.

(56) References Cited

U.S. PATENT DOCUMENTS

| | | | |
|---|---|---|---|
| 3,798,198 A | 3/1974 | Hole | |
| 3,983,058 A | 9/1976 | Hirooka et al. | |
| 4,246,360 A * | 1/1981 | Brown | C08G 18/6446 |
| | | | 521/107 |
| 4,327,195 A * | 4/1982 | Cioca | C08G 18/6446 |
| | | | 521/163 |
| 4,966,920 A | 10/1990 | Gainer et al. | |
| 5,395,860 A * | 3/1995 | Leung | C08J 9/0019 |
| | | | 521/137 |
| 5,401,783 A | 3/1995 | Bowen | |
| 5,569,707 A * | 10/1996 | Blum | C08G 18/12 |
| | | | 524/591 |
| 5,880,250 A * | 3/1999 | Housel | C08G 18/4263 |
| | | | 252/182.28 |
| 5,905,113 A | 5/1999 | Licht et al. | |
| 6,458,874 B1 | 10/2002 | Newton | |
| 6,939,916 B2 | 9/2005 | Merritt et al. | |
| 7,265,166 B2 | 9/2007 | Gebhard et al. | |
| 8,519,031 B2 * | 8/2013 | Parker | C08L 97/02 |
| | | | 435/68.1 |
| 2007/0072992 A1 | 3/2007 | Chen et al. | |
| 2009/0298989 A1 | 12/2009 | Funston | |
| 2010/0004386 A1 | 1/2010 | Nishino | |
| 2012/0183794 A1 * | 7/2012 | Guo | C08G 18/6212 |
| | | | 428/479.6 |
| 2013/0149510 A1 | 6/2013 | Meyer et al. | |
| 2014/0235737 A1 * | 8/2014 | Parker | C08H 1/00 |
| | | | 521/174 |
| 2016/0226114 A1 | 8/2016 | Hartmann et al. | |
| 2018/0208817 A1 * | 7/2018 | Parker | D21H 17/15 |
| 2019/0300428 A1 | 10/2019 | Hess et al. | |
| 2019/0380936 A1 | 12/2019 | Son et al. | |
| 2020/0207905 A1 | 7/2020 | Li et al. | |

FOREIGN PATENT DOCUMENTS

| | | | | |
|---|---|---|---|---|
| AU | 2009215691 A1 * | 9/2010 | .......... | C08F 290/147 |
| AU | 2013329250 A1 * | 4/2015 | .............. | C08K 5/13 |
| CA | 2868384 A1 * | 10/2013 | ......... | C08G 18/0823 |

(Continued)

OTHER PUBLICATIONS

Gao, Z., Wang, W., Zhao, Z. and Guo, M. (2011), Novel whey protein-based aqueous polymer-isocyanate adhesive for glulam. J. Appl. Polym. Sci., 120: 220-225. https://doi.org/10.1002/app.33025 (Year: 2011).*

Alexander A. Kortt, J.Bruce Caldwell, Low molecular weight albumins from sunflower seed: identification of a methionine-rich albumin,Phytochemistry,vol. 29, Issue 9,1990,pp. 2805-2810,ISSN 0031-9422, (Year: 1990).*

T. Punnett* and Ethyl C. Derrenbacker, J. gen. Microbiol. (1966), 44, 105-114 , (Year: 1966).*

(Continued)

Primary Examiner — Robert S Jones, Jr.
Assistant Examiner — Lily K Sloan
(74) Attorney, Agent, or Firm — Boyle Fredrickson S.C.

(57) ABSTRACT

Water-based compositions that include a reaction product formed by reacting a polyol and an aminopolycarboxylic compound are discussed herein. The water-based compositions can include an isocyanate.

7 Claims, No Drawings

(56) References Cited

FOREIGN PATENT DOCUMENTS

| | | | | |
|---|---|---|---|---|
| CA | 3016850 C | * | 12/2020 | .......... C08F 290/061 |
| CN | 103205224 | | 7/2013 | |
| CN | 105349058 | | 2/2016 | |
| CN | 105713543 | | 12/2017 | |
| CN | 109790103 A | * | 5/2019 | ............... B05D 1/02 |
| DE | 102005012813 | | 2/2015 | |
| ES | 2619849 T3 | * | 6/2017 | ............. B27N 3/002 |
| JP | H07238234 A | | 9/1995 | |
| JP | 2002020467 | | 1/2002 | |
| JP | 2004189964 | | 7/2004 | |
| JP | 2007106797 | | 4/2007 | |
| JP | 2013237154 | | 11/2013 | |
| JP | 2016041637 A | * | 3/2016 | |
| JP | 2017088798 A | * | 5/2017 | |
| JP | 2017149899 A | * | 8/2017 | |
| JP | 2019210308 A | * | 12/2019 | |
| WO | 1998015601 | | 4/1998 | |
| WO | WO-2006047746 A1 | * | 5/2006 | ......... C08G 18/0823 |
| WO | 2016199847 | | 12/2016 | |

OTHER PUBLICATIONS

Rishi Shukla, Munir Cheryan, Zein: the industrial protein from corn, Industrial Crops and Products, vol. 13, Issue 3, 2001, pp. 171-192, ISSN 0926-6690, (Year: 2001).*

Claudia Oviedo and Jaime Rodríguez* Claudia Oviedo and Jaime Rodríguez* Quim. Nova, vol. 26, No. 6, 901-905, 2003 (Year: 2003).*

International Preliminary Report on Patentability for related PCT Application PCT/US2020/041331, mailed Jan. 27, 2022 (8 pgs).

International Search Report & Written Opinion for related PCT Application PCT/US2020/041331, mailed Oct. 26, 2020 (13 pgs).

Office Action from corresponding Japanese patent application No. 2022-500721 dated Jul. 30, 2024.

* cited by examiner

WATER-BASED COMPOSITIONS

This application is a National Stage Application under 35 U.S.C. § 371 of International Application Number PCT/US2020/041331, filed Jul. 9, 2020 and published as WO 2021/011284 on Jan. 21, 2021, which claims the benefit to U.S. Provisional Application 62/873,251, filed Jul. 12, 2019, the entire contents of which are incorporated herein by reference in its entirety

FIELD OF DISCLOSURE

Embodiments of the present disclosure are directed towards water-based compositions, more specifically, embodiments are directed towards solventless compositions that include a reaction product formed by reacting a polyol and an aminopolycarboxylic compound.

BACKGROUND

Water-based compositions may include a polyol, an isocyanate, and water, among other possible components. A water-based composition may be brought into contact with two substrates such that the polyol and the isocyanate can react with each other to form a cured product and form a bond between the two substrates, when utilized for an adhesive application, for instance. A water-based composition may be brought into contact with one substrate such that the polyol and the isocyanate can react with each other to form a cured product, when utilized for a coating application, for instance.

SUMMARY

The present disclosure provides water-based including: a reaction product made by reacting a polyol and an aminopolycarboxylic compound; an isocyanate; and water.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Reaction products of a polyol and an aminopolycarboxylic compound are disclosed herein. The reaction product can be utilized in a water-based composition that may desirably provide one or more improved properties.

For instance, water-based compositions including the reaction product may provide an improved, i.e. increased, T-peel bond strength at 7 days as compared to other compositions that include a polyol that is similar to the polyol used to make the reaction product. An increased T-peel bond strength at 7 days indicates a greater adhesive strength, which is desirable for a number of applications.

Additionally, water-based compositions including the reaction product may provide an improved, i.e. increased, boil in bag value, as compared to other compositions that include a polyol that is similar to the polyol used to make the reaction product. The improved boil in bag value can indicate a greater adhesion strength when packaging products made with the adhesive compositions disclosed herein are utilized in conjunction with consumer products. A greater adhesion strength is desirable for a number of applications.

Additionally, water-based compositions including the reaction product may provide improved, e.g., faster, curing as compared to other compositions that include a polyol that is similar to the polyol used to make the reaction product.

As mentioned, reaction products of a polyol and an aminopolycarboxylic compound are disclosed herein. As used herein, "aminopolycarboxylic compound" includes derivatives and/or structural analogs thereof. One or more embodiments provide that the aminopolycarboxylic compound is an ethylenediaminetetraacetic compound. Examples of aminopolycarboxylic compounds, derivatives, and/or structural analogs include, but are not limited to, ethylenediaminetetraacetic anhydride, ethylenediaminetetraacetic acid, diethylenetriaminepentaacetic acid dianhydride, 4,4'-(propane-1,2-diyl)bis(morpholine-2,6-dione), 4,4'-(propane-1,3-diyl)bis(morpholine-2,6-dione), and 4,4'-(oxybis(ethane-2,1-diyl))bis(morpholine-2,6-dione). One or more embodiments of the present disclosure provide that the ethylenediaminetetraacetic compound can be selected from ethylenediaminetetraacetic anhydride, ethylenediaminetetraacetic acid, and combinations thereof.

Ethylenediaminetetraacetic dianhydride may be represented by the following formula:

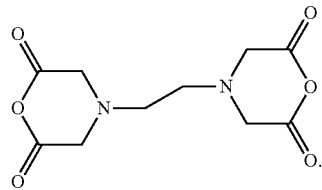 [SMILES: O=C1CN(CCN2CC(=O)OC(=O)C2)CC(=O)O1]

Embodiments of the present disclosure provide that the polyol that is reacted with the aminopolycarboxylic compound can be a polyether polyol, a polyester polyol, or combinations thereof.

The polyol can be made by a known process, e.g. by using known components, known equipment, and known reaction conditions. The polyol can be obtained commercially. Examples of commercially available polyols include, but are not limited to, polyols sold under the trade name VORANOL™, TERCAROL™, MOR-FREE™, PRIPLAST™, and VORATEC™, among others.

One or more embodiments of the present disclosure provide that the polyol can include a polyether polyol. Polyether polyols can be prepared by known processes. For instance, polyether polyols can be prepared by anionic polyaddition of one or more alkylene oxides, such as ethylene oxide, propylene oxide, and butylene oxide. A starter compound, which may be referred to as an initiator is any organic compound that is to be alkoxylated in the polymerization reaction. The initiator may contain 2 or more hydroxyl and/or primary or secondary amine groups. Mixtures of starter compounds/initiators may be used. Examples of initiator compounds include, but are not limited to, ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol, sucrose, as well as alkoxylates (especially ethoxylates and/or propoxylates) of any of these, polyamines, or dialkanolamines.

One or more embodiments of the present disclosure provide that the polyol can include a polyester polyol. Polyester-polyols may be prepared from, for example, organic dicarboxylic acids having from 2 to 12 carbon atoms, including aromatic dicarboxylic acids having from 8 to 12 carbon atoms and polyhydric alcohols, including diols having from 2 to 12 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomeric naphthalenedicarboxylic acids. The dicarboxylic acids may be used either individually or mixed with one another. Free dicarboxylic acids may be replaced by a corresponding dicarboxylic acid derivative, for example, dicarboxylic esters of alcohols having 1 to 4 carbon atoms or dicarboxylic anhydrides. Some particular examples may utilize dicarboxylic acid mixtures including succinic acid, glutaric acid and adipic acid in ratios of, for instance, from 20 to 35:35 to 50:20 to 32 parts by weight, and adipic acid, and mixtures of phthalic acid and/or phthalic anhydride and adipic acid, mixtures of phthalic acid or phthalic anhydride, isophthalic acid and adipic acid or dicarboxylic acid mixtures of succinic acid, glutaric acid and adipic acid and mixtures of terephthalic acid and adipic acid or dicarboxylic acid mixtures of succinic acid, glutaric acid and adipic acid. Examples of dihydric and polyhydric alcohols are ethylene glycol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane, among others. Some particular examples provide that ethylene glycol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, e.g., ε-caprolactone or hydroxycarboxylic acids, e.g., ω-hydroxycaproic acid and hydrobenzoic acid, may also be employed.

Polyester polyols can be prepared by polycondensing organic polycarboxylic acids and/or derivatives thereof with polyhydric alcohols in a molar ratio of from 1:1 to 1:1.8, e.g., from 1:1.05 to 1:1.2, for instance.

The polyol that is used to make the reaction product disclosed herein can have a weight average molecular weight from 300 to 12,000 g/mol. All individual values and subranges from 300 to 12,000 g/mol are included; for example the polyol can have a weight average molecular weight from a lower limit of 300, 400, 500, 750, or 1000 to an upper limit of 12,000, 10,000, 8000, 5000, or 3000 g/mol.

The polyol that is used to make the reaction product disclosed herein can have an average functionality, i.e. hydroxyl functionality, from 1.5 to 5.0. All individual values and subranges from 1.5 to 5.0 are included; for example the polyol can have an average functionality from a lower limit of 1.5, 1.7, or 2.0 to an upper limit of 5.0, 4.0, or 3.0.

The reaction product of the polyol and the aminopolycarboxylic compound can be made by reacting the polyol and aminopolycarboxylic compound at a molar ratio from 100:0.5 to 100:10 moles of polyol hydroxyl group to moles of aminopolycarboxylic compound functional group. All individual values and subranges from 100:0.5 to 100:10 moles of polyol hydroxyl group to moles of aminopolycarboxylic compound functional group are included; for example the polyol can reacted with the aminopolycarboxylic compound at a molar ratio from 100:0.5, 100:1, 100:2, 100:3, 100:4, 100:5, 100:6, 100:7, 100:8, 100:9 or 100:10 moles of polyol hydroxyl group to moles of aminopolycarboxylic compound functional group. Aminopolycarboxylic compound functional groups include dianhydride, monoanhydride diacid, tetra acid, and combinations thereof.

The reaction product can be formed using known equipment and reaction conditions. For instance, the reactants, i.e. the polyol and the aminopolycarboxylic compound may be heated to any desirable temperature, for a specified time sufficient to effectuate a desirable chemical/physical transformation. As an example, the reaction product can be formed at a temperature from 50° C. to 200° C.; the reaction may occur, e.g. be maintained, from about 5 minutes to about 48 hours; and the reaction may occur in an inert environment, such as a nitrogen environment. The reaction product can optionally be formed with a catalyst.

The reaction product of the polyol and the aminopolycarboxylic compound can include from 0.03 to 10.0 weight percent of units derived from the aminopolycarboxylic compound based upon a total weight of the reaction product. All individual values and subranges from 0.03 to 10.0 weight percent of units derived from the aminopolycarboxylic compound are included; for example reaction product can include from a lower limit of 0.03, 0.05, 0.08, or 1.0 to an upper limit of 10.0, 8.0, 6.0, or 5.0 weight percent of units derived from the aminopolycarboxylic c compound based upon a total weight of the reaction product.

Embodiments of the present disclosure provide water-based compositions that include the reaction product of a polyol and the aminopolycarboxylic compound, and an isocyanate. The water-based compositions can be prepared, e.g., mixed, utilizing known conditions and known equipment, which may vary for different applications.

The isocyanate may be a polyisocyanate. As used herein, "polyisocyanate" refers to a molecule having an average of greater than 1.0 isocyanate groups/molecule, e.g. an average isocyanate functionality of greater than 1.0.

The isocyanate can be an aliphatic polyisocyanate, a cycloaliphatic polyisocyanate, an araliphatic polyisocyanate, or combinations thereof, for example. Examples of isocyanates include, but are not limited to, 4,4'-diisocyanatodicyclohexylmethane, 3-isocyanatomethyl-3,3,5-trimethylcyclohexyl isocyanate (isophorone diisocyanate IIPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, 1,4-bis(isocyanatomethyl)cyclohexane, 1,3-bis(isocyanatomethyl)cyclohexane, and combinations thereof, among others. As well as the isocyanates mentioned above, partially modified polyisocyanates including uretdione, isocyanurate, carbodiimide, uretonimine, allophanate or biuret structure, and combinations thereof, among others, may be utilized.

The isocyanate can be polymeric. As used herein "polymeric", in describing the isocyanate, refers to higher molecular weight homologues and/or isomers. For instance, polymeric hexamethylene diisocyanate (HDI) refers to a higher molecular weight homologue and/or an isomer of hexamethylene diisocyanate (HDI), dimer, trimer, or oligomer, or combinations thereof.

The isocyanate can be a prepolymer. For instance, the isocyanate can be an isocyanate terminated prepolymer, e.g., an isocyanate terminated polyurethane prepolymer. The prepolymer can be made by reacting an isocyanate and a polyol.

As mentioned, the isocyanate can have an average functionality of greater than 1.0 isocyanate groups/molecule. For instance, the isocyanate can have an average functionality from 1.75 to 3.50. All individual values and subranges from 1.75 to 3.50 are included; for example, the isocyanate can have an average functionality from a lower limit of 1.75, 1.85, or 1.95 to an upper limit of 3.50, 3.40 or 3.30.

The isocyanate can have an isocyanate equivalent weight 84 g/eq to 1000 g/eq. All individual values and subranges from 84 to 1000 g/eq are included; for example, the isocyanate can have an isocyanate equivalent weight from a lower limit of 84, 95, 115, 125, 135, or 145 to an upper limit of 1000, 800, 600, 500, 300, 290, or 280 g/eq.

The isocyanate may be prepared by a known process. For instance, the polyisocyanate can be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The isocyanate may be obtained commercially. Examples of commercial isocyanates and/or NCO terminated prepolymers that may be utilized include, but are not limited to, isocyanates under the trade names MOR-FREE™, VORANATE™, and PAPI™ available from The Dow Chemical Company, among other commercial isocyanates.

The isocyanate can be utilized such that the water-based composition has an isocyanate index in a range from 0.9 to 1.6. The isocyanate index may be determined as equivalents of isocyanate divided by the total equivalents of isocyanate-reactive components of the water-based composition, e.g., isocyanate-reactive hydrogen, multiplied. In other words, the isocyanate index can be determined as a ratio of isocyanate-groups to isocyanate-reactive hydrogen. All individual values and subranges from 0.9 to 1.6 are included; for example, the water-based composition can have an isocyanate index from a lower limit of 0.9, 1.0, 1.05, or 1.1 to an upper limit of 1.6, 1.5, 1.45, or 1.4.

The water-based compositions include water. For instance, the water-based composition may be a dispersion such that water is a continuous phase. As used herein, a "water-based composition" refers to a composition that includes at least 10 weight percent of water based upon a total weight of the reaction product, the isocyanate, and the water. The water can be from 10 weight percent to 80 weight percent of the water-based composition based upon a total weight of the reaction product, the isocyanate, and the water. All individual values and subranges from 10 weight percent to 80 weight percent are included; for example, the water can be from a lower limit of 10, 12, or 15 weight percent to an upper limit of 80, 75, or 70 weight percent based upon the total weight of the reaction product, the isocyanate, and the water.

The water-based composition can include a catalyst, e.g., a known catalyst utilized for the formation of polyurethanes. Examples of catalysts include, aluminum catalysts, bismuth catalysts, tin catalysts, vanadium catalysts, zinc catalysts, zirconium catalysts, titanium catalysts, amine catalysts, and combinations thereof. One or more embodiments provide that the catalyst is selected from dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, dibutyltin oxide, and combinations thereof. When utilized, the catalyst can be from 0.001 parts per million parts (ppm) to 100 ppm based on a total weight of the water-based composition. For instance, the catalyst can be from 0.005 ppm to 10 ppm based on a total weight of the water-based composition.

Embodiments of the present disclosure provide that the water-based compositions can include one or more additional components, such as known components that are utilized with adhesive compositions and/or known components that are utilized with coating compositions, for instance. Different additional components and/or different amounts of the additional components may be utilized for various applications. Examples of additional components include organic solvents, polyols, surfactants, chelating agents, crosslinkers, chain extenders, antioxidants, and combinations thereof, among other known components.

Advantageously, the water-based compositions can be applied to a material. For instance, the water-based composition can be applied to a first material and a second material may be contacted with the water-based composition; thereafter, the water-based composition may be cured to form a laminate. Also, the water-based composition can be applied to a first material and then the composition may be cured to form a coating. The water-based compositions can be applied by a known process, e.g., by using known components, known equipment, and known application conditions, such as gravure lamination, flexo-graphic lamination, etc. Additionally, components of the water-based composition can be applied on different substrates and then be laminated together.

The water-based compositions disclosed herein can be cured, e.g., the reaction products of the polyol and the aminopolycarboxylic compound and the isocyanate can react with each other, to form a cured product. Known curing conditions, such as temperature, humidity, and duration, may be utilized to cure the water-based compositions disclosed herein.

Advantageously, the water-based compositions disclosed herein may provide, e.g., when cured, an improved T-peel bond strength at 7 days as compared to other compositions that include a polyol that is similar to the polyol used to make the reaction product. As mentioned, the increased T-peel bond strength at 7 days indicates a greater adhesive strength. This greater adhesive strength may desirably help provide greater sealing for products made with the adhesive compositions disclosed herein.

Advantageously, the water-based compositions disclosed herein may provide, e.g., when cured, an improved boil in bag value as compared to other compositions that include a polyol that is similar to the polyol used to make the reaction product. The improved boil in bag value indicates greater adhesion strength when packaging products made with the water-based compositions disclosed herein are utilized in conjunction with consumer products, such as sauces, among others. In other words, the improved boil in bag value may indicate a desirable improved consumer product resistance to package failure.

Additionally, water-based compositions including the reaction product may provide improved, e.g., faster, curing as compared to other compositions that include a polyol that is similar to the polyol used to make the reaction product.

As used herein, a polyol that is similar to the polyol used to make the reaction product refers to a polyol refers that is the same as the polyol that is utilized to make the reaction product; or a polyol that has a weight average molecular weight that is ±10% and an average hydroxyl functionality that is ±10% as compared to the polyol that is utilized to make the reaction product.

Embodiments provide that the water-based compositions may be utilized with various materials, e.g., substrates. Examples of materials that may be utilized with the water-based compositions disclosed herein include polymeric materials, such as polyethylene terephthalate, polyethylene, polypropylene, and combinations thereof. The polymeric material may be a film, for instance. Embodiments provide that the materials that may be utilized with the water-based compositions may include a metal, e.g., a foil or a metallized film. Foils and metallized films are well known. For instance, a polymeric material may be pretreated, such as by corona treatment and plasma treatment, prior to metallization. Then, metallization may be performed by a physical vapor deposition process. In such processes, the metal is heated and evaporated under vacuum. The metal then condenses on the polymeric material to form a metallized film. Examples of suitable metals include, but are not limited to aluminum, nickel, chromium, and combinations thereof. Embodiments provide that the water-based compositions may be utilized for film-to-film laminations and film-to-foil laminations, for example.

EXAMPLES

In the Examples, various terms and designations for materials are used including, for instance, the following:

Aminopolycarboxylic compound (ethylenediaminetetraacetic dianhydride; obtained from Aldrich);

triethylamine (obtained from Aldrich);

MOR-FREE CR9-101 (isocyante; obtained from The Dow Chemical Company);

MOR-FREE C-33 (aliphatic isocyante; obtained from The Dow Chemical Company);

VORANOL P-425 (polyether polyol; obtained from The Dow Chemical Company);

POLYSTEP B-5-N (surfactant; obtained from The Dow Chemical Company);

VERSENOL 120 (chelating agent; obtained from The Dow Chemical Company);

Metalized PET film (metalized 48 g PET film; obtained from Filmquest Group); PET film (48 LBT; Polyester film [Poly(ethylene glycol-terephthalate]; obtained from DuPont); PET/Foil laminated film (PET Al foil film; obtained from FILM TECH Inc.); Low density polyethylene film (GF-19 film; high slip low density film; thickness 1.5 mil; obtained from Berry Plastics Corp).

Lab synthesized polyester polyol was made as follows. 1,6-Hexane diol (1012.3 grams; obtained from Aldrich), neopentyl glycol (494.9 grams; obtained from Aldrich), and adipic acid (1492.8 grams; obtained from Aldrich) were added to a container under a nitrogen atmosphere; the contents of the container were slowly heated from approximately 25° C. to approximately 100° C. while being stirred. Then, the contents of the container were slowly heated to approximately 190° C. and maintained at that temperature until the acid value was approximately 10 mg KOH/g. Then, the contents of the container were cooled to approximately 125° C. and titanium isoproxide (0.03 grams; obtained from Aldrich) was added to the container and the contents of the container were maintained at approximately 125° C. for 30 minutes. Then, the contents of the container were slowly heated to approximately 190° C. and maintained at that temperature until the acid value was approximately 1 mg KOH/g; vacuum (435 mm Hg) was applied as needed in decreasing the acid value. Then, the contents of the container were cooled to approximately 125° C. and filtered to provide the lab synthesized polyester polyol.

Example 1, a reaction product of a polyol and ethylenediaminetetraacetic dianhydride, was made as follows. Lab synthesized polyester polyol (99 grams) was added to a container and dried at approximately 105° C. for 60 minutes under flowing nitrogen. Then, ethylenediaminetetraacetic dianhydride (1 gram) was added to the container and the contents of the container were slowly heated to 170° C. and maintained at that temperature for approximately 3 hours; thereafter, the contents of the container were slowly heated to 180° C. and maintained at that temperature for approximately 30 minutes. Then, the contents of the container were cooled to approximately 90° C. and filtered to provide Example 1. Example 1 included 1.0 weight percent of units derived from ethylenediaminetetraacetic dianhydride, based upon a total weight of Example 1.

A number of properties were determined for Example 1 and the lab synthesized polyester polyol. OH number was determined according to ASTM E 1899-08; acid value was determined according to ASTM D4274-16; number average molecular weight (MN) and weight average molecular weight (Mw) were via SEC analysis described as follows. Respective samples (0.01 gram) were dissolved in tetrahydrofuran (4.0 mL) to provide sample concentrations (2.5 mg/mL). Separation module: Waters e2695; column: Polymer Labs PLGel Mixed E column×2, 3 µm particle size and Mixed C column×1, 5 µm particle size; column temperature: 40° C.; eluent: tetrahydrofuran (unstabilized); flow rate: 1 mL/min; injection volume: 50 µL; analysis time: 40 minutes; detector: Waters 2414 Refractive Index Detector (40° C.); calibration: Agilent Technologies Polystyrene (PS)-Medium EasiVials, batch number 0006386106; software. Agilent OpenLAB CDS (EZChrome Edition) Version A.04.06.

The results are reported in Table 1

TABLE 1

|  | Example 1 | Lab synthesized polyester polyol |
|---|---|---|
| OH Number (mg KOH/g) | 66 | 67 |
| Acid Value (mg KOH/g) | 4.8 | 0.4 |
| Number average molecular weight | 1840 | 1680 |
| Weight average molecular weight | 2700 | 3420 |
| Molecular weight dispersity ($M_w/M_n$) | 2.01 | 2.04 |

The data of Table 1 illustrate that for Example 1, a reaction product of the polyol and ethylenediaminetetraacetic dianhydride was made.

Waterborne formulation 1, which included Example 1 as discussed above, was made as follows. Example 1 was added to a container and heated to 70° C. Then, the components and amounts indicated in Table 2 were added to the container and the contents of the container were mixed via a FlackTek High Speed Mixer at 1800 RPM for 3 minutes. Thereafter, deionized water (70° C.) was added to the container and the contents of the container were mixed at 1800 RPM for an additional 15 minutes.

Waterborne formulation A, which included lab synthesized polyester polyol as discussed above, was made as Waterborne formulation 1 with changes in components and amounts indicated in Table 2.

Waterborne formulation B, which included lab synthesized polyester polyol as discussed above, was made as Waterborne formulation 1 with changes in components and amounts indicated in Table 2.

Properties reported in Table 2 were determined with a Nanotrac Ultra (Microtrac, Inc.).

TABLE 2

|  | Waterborne formulation 1 | Waterborne formulation A | Waterborne formulation B |
|---|---|---|---|
| Example 1 | 20.17 (grams) | — | — |
| Lab synthesized polyester polyol | — | 20.05 (grams) | 20.07 (grams) |
| Triethylamine | 0.29 (grams) | 0.29 (grams) | 0.47 (grams) |
| VORANOL P-425 | 0.25 (grams) | 0.25 (grams) | 0.24 (grams) |
| POLYSTEP B-5-N | 0.0057 (grams) | 0.0062 (grams) | 0.0061 (grams) |
| VERSENOL 120 | — | — | 0.56 (grams) |
| Methyl ethyl ketone | 6.05 (grams) | 6.04 (grams) | 6.01 (grams) |
| Deionized water | 34.62 (grams) | 30.70 (grams) | 30.08 (grams) |
| Solids content (%) | 33.7 | 35.9 | 37.2 |
| Mean diameter (intensity distribution) | 2655 (nm) | 4220 (nm) | 3240 (nm) |
| Mean diameter (number distribution) | 177 (nm) | 3790 (nm) | 3150 (nm) |
| Mean diameter (area distribution) | 469 (nm) | 4070 (nm) | 3210 (nm) |
| Polydispersity index | 2.431 | 0.0809 | 0.0146 |

Example 2, a water-based composition, was made as follows. The components and amounts indicted in Table 3 were added to a container and mixed.

Comparative Example A was made as Example 2 with changes in components and amounts indicated in Table 3.

TABLE 3

|  | Example 2 | Comparative Example A |
|---|---|---|
| Waterborne formulation 1 | 57.38 grams | — |
| Waterborne formulation A | — | 57.33 grams |
| MOR-FREE CR9-101 | 5.42 grams | 5.41 grams |
| MOR-FREE C-33 | 5.43 grams | 5.41 grams |
| Solids content (weight %) | 46.2 | 46.1 |
| Isocyanate index | 1.2 | 1.2 |

Laminates were prepared utilizing Example 2 as follows. An oil heated roll hand laminator (nip temperature of 150° F.; running speed of 20 ft/min) and a coating weight of approximately 1.05 pounds/ream were utilized. The laminates were prepared sheet by sheet with an approximately 12 inch by 10 inch coated area. Example 3 was formulated as 35 weight percent solids in ethyl acetate and then coated onto a primary film; the coated primary film was oven dried (90° C.; approximately 1 minute). Then the coated primary film was laminated onto a secondary film with the oil heated roll hand laminator (approximately 40 psi); then the laminates were cured at approximately 20° C. for seven days.

Laminates were prepared, as discussed above, utilizing Comparative Example A.

T-peel bond strength testing and boil in bag testing was performed on the laminates. The results are reported in Table 4.

T-peel bond strength was measured on a 1 inch strip at a rate of 10 inch/min on an Instron tensile tester with a 50 N loading cell. Three strips were tested for each laminate and high and mean strength were recorded together with the failure mode. In cases of film tear and film stretch, the high value was reported and in other failure modes the average T-peel bond strength was reported.

Boil in bag testing of laminates was performed as follows. A cured laminate (9 inch by 11 inch) was folded over to form a double layer such that the PE film of one layer was in contact with the PE film of the other layer. The edges were then trimmed with a paper cutter to obtain a folded piece (approximately 5 inches by 7 inches). The edges were then heat sealed to form a pouch with an interior size of 4 inches by 6 inches. The pouches were then filled 100 mL of a sauce blend of equal parts by weight of catsup, vinegar, and vegetable oil through the open edge. After filling, the pouch was sealed in a manner that minimized the air entrapment inside of the pouch. The filled pouches were then carefully placed in boiling water and kept immersed in the water for 30 minutes or 60 minutes. When completed, the extent of tunneling, delamination, or leakage was compared with marked pre-existing flaws.

TABLE 4

|  | Example 2 | Comparative Example A |
|---|---|---|
|  | Primary film: PET/Foil laminated film (foil side was coated) Secondary film: Polyethylene film | |
| T-peel bond strength (7 days) | 253 ± 17 g/25 mm | 153 ± 6 g/25 mm |
| Failure mode | Adhesive transfer (adhesive with primary film) | Adhesive transfer (adhesive with primary film) |
| Boil in bag (30 minutes) | 39 ± 4 g/25 mm | 18 ± 2 g/25 mm |
| Boil in bag failure mode | Adhesive transfer (adhesive with secondary film) | Adhesive transfer (adhesive with secondary film) and delamination |

The data of Table 4 illustrate that Example 2 advantageously had an improved T-peel bond strength at 7 days, as compared Comparative Example A, for a laminate that included a metalized film.

Additionally, the data of Table 4 illustrate that Example 2 advantageously had an improved boil in bag value at 30 minutes, as compared Comparative Example A, for a laminate that included a metalized film. The improved boil in bag value advantageously illustrated greater adhesion strength for the sauce blend tested.

Example 3, a water-based composition, was made as follows. The components and amounts indicted in Table 5 were added to a container and mixed.

Comparative Examples B-C were made as Example 3 with changes in components and amounts indicated in Table 5.

TABLE 5

|  | Example 3 | Comparative Example B | Comparative Example C |
|---|---|---|---|
| Waterborne formulation 1 | 56.85 grams | — | — |
| Waterborne formulation A | — | 57.24 grams | — |
| Waterborne formulation B | — | — | 57.43 grams |

TABLE 5-continued

|  | Example 3 | Comparative Example B | Comparative Example C |
|---|---|---|---|
| MOR-FREE CR9-101 | 12.23 grams | 12.46 grams | 12.35 grams |
| Solids content (weight %) | 47.8 | 47.7 | 48.3 |
| Isocyanate index | 1.2 | 1.2 | 1.2 |

Laminates were prepared, as discussed above, utilizing Example 3 and Comparative Examples B-C.

T-peel bond strength testing and boil in bag testing, as discussed above, was performed on the laminates. The results are reported in Table 6.

TABLE 6

|  | Example 3 | Comparative Example B | Comparative Example C |
|---|---|---|---|
| Primary film: PET/Foil laminated film (foil side was coated) Secondary film: Polyethylene film | | | |
| T-peel bond strength (7 days) | 235 ± 4 g/25 mm | 170 ± 16 g/25 mm | 74 ± 11 g/25 mm |
| Failure mode | Adhesive transfer (adhesive with primary film) | Adhesive transfer (adhesive with primary film) | Adhesive transfer (adhesive with primary film) |
| Boil in bag (30 minutes) | 63 ± 8 g/25 mm | 10 ± 5 g/25 mm | 0 g/25 mm |
| Boil in bag failure mode | Adhesive transfer (adhesive with secondary film) | Adhesive transfer (adhesive with secondary film) and delamination | Delamination |
| Primary film: Metalized PET film Secondary film: PET film | | | |
| T-peel bond strength (7 days) | 76 ± 12 g/25 mm | 53 ± 3 g/25 mm | 29 ± 12 g/25 mm |
| Failure mode | Adhesive transfer (adhesive with primary film) | Adhesive transfer (adhesive with primary film) | Adhesive transfer (adhesive with primary film) |

The data of Table 6 illustrate that Example 3 advantageously had an improved T-peel bond strength at 7 days, as compared Comparative Examples B-C, for laminates that included a metalized film.

Additionally, the data of Table 6 illustrate that Example 3 advantageously had an improved boil in bag value at 30 minutes, as compared Comparative Examples B-C, for a laminate that included a metalized film. The improved boil in bag value advantageously illustrated greater adhesion strength for the sauce blend tested.

What is claimed is:

1. A water-based composition comprising:
a reaction product made by reacting a polyol and an aminopolycarboxylic compounds, wherein the aminopolycarboxylic compound is an ethylenediaminetetraacetic compound and the reaction product has from 0.03 to 2 weight percent of units derived from the aminopolycarboxylic compound based upon a total weight of the reaction product;
an isocyanate; and
water.

2. The water-based composition of claim 1, wherein the aminopolycarboxylic compound is selected from ethylenediaminetetraacetic anhydride, ethylenediaminetetraacetic acid, and combinations thereof.

3. The water-based composition of claim 1, wherein the polyol has a weight average molecular weight from 300 to 12,000 g/mol.

4. The water-based composition of claim 1, wherein the water-based composition has an isocyanate index in a range from 1.0 to 1.6.

5. The water-based composition of claim 1, wherein the water is from 10 weight percent to 80 weight percent of the water-based composition based upon a total weight of the reaction product, the isocyanate, and the water.

6. A laminate formed from the water-based composition of claim 1.

7. The water-based composition of claim 1, wherein the reaction product has an acid value of less than 5.

* * * * *